Figure 1:
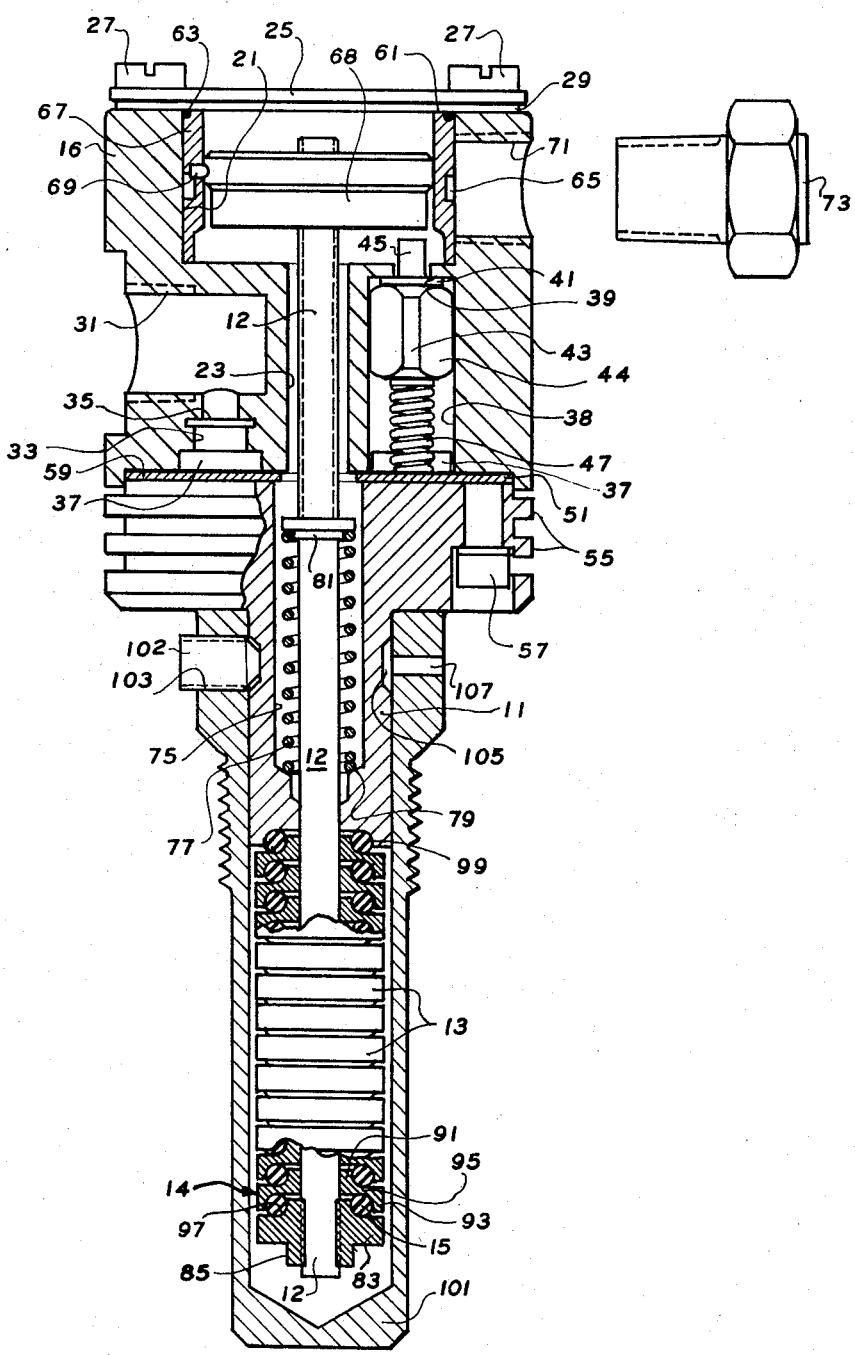

United States Patent [19]

Bilbrey

[11] 3,784,095
[45] Jan. 8, 1974

[54] TEMPERATURE RESPONSIVE DEVICE
[75] Inventor: Robert A. Bilbrey, Orinda, Calif.
[73] Assignee: Benjamin W. West d/b/a California Controls Company, Berkeley, Calif.
[22] Filed: Feb. 14, 1972
[21] Appl. No.: 226,043

[52] U.S. Cl.................... 236/101, 73/363.1, 60/23, 337/335
[51] Int. Cl. .......................................... G05d 23/02
[58] Field of Search.......................... 60/23; 236/101; 73/363.1; 337/335

[56] References Cited
UNITED STATES PATENTS
3,121,331  2/1964  Von Platen ...................... 236/101 R
3,189,277  6/1965  Fox ................................. 236/101 B
2,193,588  3/1940  Galloway ........................... 236/101
3,194,009  7/1965  Baker....................................... 60/23

Primary Examiner—William E. Wayner
Assistant Examiner—William E. Tapolcai, Jr.
Attorney—William E. Anderson et al.

[57] ABSTRACT

A temperature responsive device is described for use in operating a control element which, for example, controls the opening and closing of a valve or an electrical switch. The control element is moved by a trip rod which, in turn, is moved in response to the expansion and contraction of a plurality of aligned thermal expansion cells. Each of the expansion cells comprises an expander of a material having a high thermal expansion coefficient, and means restraining the expander against deformation other than in the direction in which the cells are aligned.

12 Claims, 1 Drawing Figure

PATENTED JAN 8 1974

3,784,095

TEMPERATURE RESPONSIVE DEVICE

This invention relates to temperature responsive devices and, more particularly, to an improved temperature responsive device having a substantially linear stroke to temperature ratio.

In many systems, it is desirable to employ a device which is responsive to changes in temperature to open, close, or otherwise regulate the system. For example, the flow of fluid through a valve may be controlled according to temperature. The valve may be used as a temperature responsive element in a main fluid system, or may be used as a temperature responsive element in a subsidiary system, such as an emergency shut-off system for various types of engines, or gas compressors. Such valves may also be utilized in the process industry as high and low limit transducers.

Other applications of temperature responsive devices of the type to which the invention pertains exist where a movable element in some way controls the flow of fluid or electrical current. For example, a temperature responsive device may be used to operate a switch or a variable resistor in an electrical circuit, or to provide a change in direction or intensity of light in an optical system. Typically, the temperature responsive device is connected to a control element of the system to cause the control element to move in response to changes in temperature. Prior art temperature responsive devices have included bimetal elements such as discs, or fluid filled expandable bellows.

Systems employing bimetal elements, such as bimetal discs, suffer from several drawbacks. The nature of bimetal elements, as typically employed in temperature responsive devices, is such that the response of the device is non-linear. Thus, a plot of temperature versus displacement or stroke for such a device would typically result in a substantial curve rather than a straight line. This means that some non-linear mechanism or scale is needed for proper calibration adding expense and making the design of the device somewhat complex. Another drawback to the use of bimetal elements is that some minimum size is typically required for each element to provide a sufficient stroke, since the stroke of the system is dependent upon the size of the bimetal element, as well as on the number of elements.

Temperature responsive devices employing fluid filled bellows type expanders are subject to some problems also. Such devices may be too delicate for certain applications, since the possibility of rupture of the filled bellows is always present. Moreover, the maintenance of adequate fluid pressure may be difficult over long periods of use, and the relatively high expense and difficult manufacturing problems inherent in such devices are undesirable.

It is an object of the present invention to provide an improved temperature responsive device.

Another object of the invention is to provide a temperature responsive device in which the stroke versus temperature ratio is substantially linear over a wide temperature range.

Another object of the invention is to provide a temperature responsive device which is easy to assemble and install.

It is another object of the invention to provide a temperature responsive device of high accuracy and minimal hysteresis.

Other objects of the invention will become apparent to those skilled in the art from the following description, taken in connection with the accompanying drawing wherein the sole FIGURE is a cross-sectional view of a temperature responsive device constructed in accordance with the invention for use in connection with a fluid valve.

Very generally, the temperature responsive device of the invention comprises a body 11 and a trip rod 12. The trip rod is mounted for movement with respect to the body. The means by which the trip rod is mounted include a plurality of thermal expansion cells 13 in mutual contact arranged in alignment in the direction the trip rod is to be moved. Each of the expansion cells comprise an expander 14 of a material having a high thermal expansion coefficient, and means 15 restraining the expander against deformation other than in the direction in which the cells are aligned.

Referring now to the drawing, the device of the invention is shown used in connection with a fluid valve. The valve comprises a housing 16 comprised of metal or other suitable material and is formed with a large diameter central bore 21 at one end thereof axially aligned and communicating with a smaller diameter central bore 23. The larger diameter central bore 21 is closed by a generally circular cover plate 25 secured to the housing 16 by suitable screws 27. A sealing gasket 29 of annular shape surrounds the central bore 21 between the housing 16 and the top plate 25.

A threaded inlet opening 31 is provided in the housing 16 bored radially thereinto to a depth which is less than the distance between the outer surface of the housing 16 and the wall of the smaller diameter central bore 23. A passage 33 of stepped diameter communicates with the inlet opening 31 on an axis which is generally normal to the axis of the inlet opening. A filter screen 35 is disposed in the passage 33 for filtering out any foreign elements which could enter the internal portions of the valve, described below. An annular recess 37 is formed in the lower surface of the housing 16 surrounding the smaller diameter central bore 23. The stepped diameter passage 33 communicates between the inlet opening 31 and the annular recess 37.

On the opposite side of the smaller diameter central bore 23 from the stepped diameter passage 33, a fluid conduit 38 is provided. The fluid conduit 38 comprises a bored passage communicating from the annular recess 37 to the larger diameter bore 21 on an axis which is parallel to the axis of the smaller diameter bore 23. The passage 38 communicates with the larger diameter bore 21 through a poppet valve seat 39. A poppet valve is provided in the passage 38 and includes a poppet 41 which engages the poppet seal 39 to close the passage 38 from the larger diameter central bore 21. The poppet valve further includes a body 43 having a plurality of flats 44 on its outer surface so that the free passage of fluid through the passage 38 and into the larger diameter bore 21 can occur. The body 43 is movable axially in the passage 38. The poppet itself is mounted on a poppet stem 45, a portion of which projects into the larger diameter bore 21 for reasons which will be explained subsequently.

The poppet 41 is biased against the poppet seat 39 to block the fluid conduit or passage 38 by means of a suitable spring 47 secured to one end of the poppet valve stem 45. As shown, the stem 45 extends through the body 43 to project on the opposite side of the body from the poppet 41. The spring 47 seats against the housing 16 and the body 43 inside the passage 38.

A circular recess 51 is provided in the lower surface of the valve housing 16 contiguous with the annular recess 37. The circular recess 51 receives the upper end of the body 11 of the temperature responsive device of the invention. The upper portion of the body 11 is of a larger diameter than the lower portion and is provided with a plurality of fins 55 for cooling the body 11. A plurality of bolts 57 are used to secure the body 11 to the lower side of the housing 16 so that the upper end of the body 11 is received in the circular recess 51. A suitably formed gasket 59 is provided between the body 11 and the housing 16 for sealing purposes, and to provide a thermal barrier for the housing 16.

A lock sleeve 61 is fitted within the larger diameter central bore 21 in the housing 16. The outer diameter of the lock sleeve is slightly less than the inner diameter of the bore 21, and an annular seal 63 is provided surrounding the upper outer corner of the lock sleeve to seal the lock sleeve against both the housing 16 and the gasket 29. The lock sleeve is provided with an annular recess 65 in its outer surface and a vertical gap or split 67 is provided extending the length of the lock sleeve.

A movable valve element 68, which is in the form of a generally flat cylinder of stepped outer diameter, is mounted on the trip rod 12. The larger diameter of the element 68 mates with the inner diameter of the lock sleeve 61 to slide axially therein. A key 69 is provided extending between the valve element 68 and the gap 67 in the lock sleeve 61 to prevent the valve element 68 from turning with respect to the lock sleeve, for reasons which will be explained below.

A horizontal threaded bore or passage 71 is provided near the upper end of the housing 16 communicating from outside the housing with the central bore of larger diameter 21. The axis of the passage 71 intersects the axis of the bore 21 generally normal thereto. A nozzle or vent connection 73, shown in exploded position, is threaded into the opening or vent passage 71. Because of the presence of the lock sleeve 61, communication between the vent passage 71 and the central larger diameter bore 21 is through the annular passage 65 in the lock sleeve and then through the vertical split or gap 67.

The valve element 68, together with the poppet 41 and its associated elements, regulate the flow of fluid through the passage or conduit 38. Upon opening of the conduit 38, a fluid flow may occur from the inlet passage 31, through the stepped diameter passage 33, the annular recess 37, the passage or conduit 38, the poppet seal 39, the central bore 21, the vertical slot 67, and the annular recess 65, to the passage 71 and thence through the vent connection or nozzle 73.

Although suitable for use as a valve in any type of system, the valve described particularly herein is for use as a temperature responsive valve in a fluid media system. In particular, the inlet passage 31 is adapted for connection to the main fluid system which is to be vented so that the pressure reduces therein upon the sensing of an increase in temperature to a certain level. The poppet 41 is biased by the spring 47 to a position which normally closes the conduit 38. Upon a sufficient rise in temperature, as will be subsequently explained, the valve element 68 engages the upper end of the poppet stem 45, thereby moving the stem against the bias of the spring 47 and removing the poppet 41 from the poppet seat 39. This opens the passage or conduit 38, and allows the fluid to flow from the inlet passage 31 through the vent passage 71, thus venting the system in a desired manner.

For the purpose of sensing temperature, the temperature sensing device of the invention is mounted to the valve. The trip rod 12 projects upwardly through the body 11 into the valve, and is operated by the plurality of thermal expansion cells 13. These cells provide movement of the trip rod 12 to move the valve element 68 into and out of engagement with the upper end of the poppet stem 45. A central opening or bore 75 is provided in the body 11 and a coil spring 77 is disposed in the central bore 75. An annular shoulder 79 is provided near the lower end of the central bore 75 upon which the spring 77 seats. The upper end of the spring 77 engages a spring stop 81 of suitable shape provided on the trip rod 12. Thus, the spring 77 biases the trip rod 12 upwardly with respect to the adapter 53.

As previously mentioned, the thermal expansion cells 13 are adapted to move the trip rod 12. More particularly, the thermal expansion cells 13 are annular in form and surround the lower portion of the trip rod on a common axis therewith. A cap 83 is secured to the lower end of the trip rod 12 by a suitable threaded collar 85. The upper end of the stack of thermal expansion cells 13 engages the lower end of the body 11 and the bias pressure provided by the spring 77 holds the stacked thermal expansion cells 13 in place. As will be explained below, the thermal expansion cells 13 change dimension axially in response to variation in temperature, thereby providing an axial movement or stroke of the trip rod 12. In this way, the valve element 68 is brought into and out of engagement with the upper end of the poppet stem 45. Of course, the device of the invention may be applied to other apparatus besides the valve shown, in which case the trip rod would be used to move a suitable control element in the apparatus.

For adjusting the valve trip point, the valve element 68 is threaded to suitably formed threads on the upper end of the trip rod 12. Adjustment of the valve element 68 with respect to the trip rod is obtained by removing the top plate 25 and rotating the lock sleeve 61. The key 69 causes rotation of the valve element 68 and thus the valve element 68 may be adjusted in its threads with respect to the trip rod 12.

Each of the thermal expansion cells comprises an annular expander 14 and means 15 restraining the expander against radial deformation. More particularly, the annular expanders are of generally circular cross section and are supported on and between a plurality of separators which are so shaped to nest within each other. Each of the separators comprises a pair of axially spaced cylindrical walls 91 and 93 of different diameters. The walls 91 and 93 are axially spaced and aligned, and an annular wall 95 joins the walls 91 and 93 and is oriented generally normal to the walls.

The inner diameter of the wall 91 is such as to provide a sliding fit between the expander and the trip rod 12 which passes therethrough. The outer diameter of the wall 91 is substantially equal to the inner diameter of the expander 14 and the surface between the wall 91 and the wall 95 is so shaped as to mate with the outer surface of the expander (i.e., is provided with a common radius). The inner diameter of the larger of the cylindrical walls 93 is substantially equal to the outer diameter of the expander 14, and the surface between the wall 95 and the wall 93 is shaped to conform with the outer surface of the expander (i.e., a common radius). Thus, each expander 14 is captured between the smaller cylindrical wall 91 of one separator and the larger cylindrical wall 93 of the immediately adjacent separator. This configuration restrains the expanders 14 against radial deformation in both directions. Accordingly, expansion and contraction of the expanders 14 due to thermal effects is translated substantially entirely in the axial direction. This maximizes the available stroke.

The cap 83 is threaded onto the lower end of the trip rod 12. An annular recess 97 is provided on the cap 83 for receiving the lowermost one of the expanders 14, and the surface of the recess is shaped to conform with the inner surface of the expander. The lower end of the cap 83 is provided with the collar 85 which is deformable so that it may be crimped to the threads of the lower end of the trip rod 12 to lock the threads. An annular recess 99 is provided on the underside of the body 11 for receiving the uppermost one of the expanders 14, and this annular recess is also shaped to conform with the outer surface of the expander.

Although the thermal expansion cells may be placed in direct contact with the media in which temperature is being sensed, it is often desirable to isolate the cells from the media. In order to accomplish this, a well 101 is provided for enclosing the thermal expansion cells and the lower portion of the body 11. The well 101 is of an elongated cup-shaped configuration and is suitably secured on the body by a set screw 102 threaded through a suitable bossed opening 103 into engagement with an annular recess 105 formed in the body. The cup 101 may be filled with a suitable heat transfer fluid, such as Dow Corning 710 fluid. A vent opening 107 is provided to allow venting of the fluid contained in the well 101.

The material of which the expanders are comprised is, as previously mentioned, a material having a high thermal expansion coefficient. Many materials having this property are available. Preferably, however, the material used is an elastomer. Most synthetic elastomers have a very high thermal expansion. For example, silicone rubber has one of the highest thermal expansions known and is also stable at temperatures of about 500° F. Naturally, the material utilized must be stable within the temperature range specified. Typically, thermal expansion for elastomers is linear throughout a wide temperature range, thereby providing a substantially linear relationship between stroke and temperature in the valve. Taking into consideration the factors of expansion, cold creep, high temperature set and deterioration, cost and resistance to external fluids, a highly satisfactory material is a fluoroelastomer. Such a material is obtainable from Du Pont Corporation under the trademark VITON.

Although the valve described herein is of a particular type as explained above, it will be apparent to those skilled in the art that various other types of valves may be constructed in accordance with the invention. For example, valves venting on a falling temperature, or valves operating in a normally open position and closing upon a certain change in temperature may also be used. Moreover, the use of an internal poppet is not necessarily required, since the valve element 68 itself may be used directly to open and close an internal passage or conduit in the valve housing. The invention is not limited to applications where a valve merely opens or closes, but is also suitable to vary the size of a valve opening in accordance with changes in temperature.

In addition to controlling valves as illustrated, the device of the invention has other applications. The device may be used to control a variable resistor or a switch in an electrical circuit by suitable attachment of the trip rod to the resistor or switch. The device may also be used in an optical system, for example with the trip rod being used to vary the angle of a mirror or the position of a mask.

By utilizing the construction of the invention, a very small overall diameter for the device may be achieved. This is because, for a given cross section of the expander 14, the expansion provided is almost independent of the diameter of its annulus. Thus, very small diameters, less than 0.200 inch, are practical. The only advantage of a larger diameter annulus for the expanders 14 is that the element is stiffer, that is, it has a higher spring rate and has therefore more force available to operate a given load. The available stroke distance is essentially the same, regardless of annulus diameter.

Another advantage of the invention is that, wherein the invention is used without the well 101, so that the thermal expansion elements or cells 13 are in direct contact with the media for which temperature is being sensed, the annular expanders 14 provide a seal. Thus, fluid can not enter the device through the expansion cells and the passage in which the trip rod is located. Moreover, because the device may be made with a very small diameter, the effects of a high pressure in the media being monitored may be minimized. In addition, because the thermal expansion takes place principally in the region between the separators, friction between the various expansion cells is minimized and thereby hysteresis components are minimized.

Because solid elastomer expanders are, by nature poor heat conductors, the separators are preferably comprised of a material having a high heat conductivity. This, coupled with the fact that the expanders are in intimate contact with the separators due to the shape of the separator surfaces, provides satisfactory heat response for the device.

Elastomers generally experience a creep or flow under load at elevated temperatures. If, however, the device is baked under load at a temperature about 50° F above the peak surface temperature, the elastomer cells will not flow and change the stroke curve under service conditions.

It may therefore be seen that the invention provides an improved temperature responsive device. The device is relatively easy to assemble, provides a linear response, and has minimal hysteresis losses. The elongated shape of the device enables the device to be inserted in wells to reach the center region of media in which temperature is to be monitored. The device has high inherent accuracy and is rugged in actual service. The trip point may be readily adjusted and the device may be made in a very small diameter unit. It is easy to provide for greater or lesser temperature versus stroke by lengthening or shortening the trip rod 12 and adding or subtracting expansion cells. Furthermore, the device is fully adaptable for use with other apparatus, such as electrical switches, rather than fluid valves as shown.

Various modifications of the invention in addition to those shown and described herein will become apparent to those skilled in the art from the foregoing de-

I claim:

1. A temperature responsive device comprising, a body, a trip rod, and means mounting said trip rod to said body for movement with respect to said body, said mounting means including a plurality of annular thermal expansion cells axially aligned in mutual contact between a portion of said body and a portion of said trip rod, each of said expansion cells comprising an annular expander of a material having a high thermal expansion coefficient, and a plurality of heat conductive separators in intimate contact with said expanders and separating same axially, said separators having a configuration restraining said expanders against expansion in a direction other than in the direction of the axial alignment of said expansion cells.

2. A device according to claim 1 wherein said thermal expansion cells surround a portion of said trip rod aligned on a common axis therewith.

3. A device according to claim 2 wherein said mounting means further include a cap mounted to one end of said trip rod, said body having a central opening therein for allowing a portion of said trip rod to project therethrough, said expansion cells being arranged axially along said trip rod between said body and said cap.

4. A device according to claim 3 including spring means biasing said cap against said expansion cells.

5. A device according to claim 1 wherein the surface of said restraining means is contoured to mate with the surfaces of said expanders.

6. A device according to claim 1 wherein the material of which said expanders are comprised is an elastomer.

7. A device according to claim 1 wherein the material of which said expanders are comprised is a fluoroelastomer.

8. A device according to claim 1 wherein each of said restraining means comprise a pair of axially spaced and aligned cylindrical walls of different diameters, and an annular wall normal thereto and joining same, the outer diameter of the smaller of said cylindrical walls being substantially equal to the inner diameter of said expanders, and the inner diameter of the larger of said cylindrical walls being substantially equal to the outer diameter of said expanders, said restraining means being nested to capture said expanders between the smaller of said cylindrical walls of one of said restraining means and the larger of said cylindrical walls of the immediately adjacent one of said restraining means.

9. A temperature responsive valve, comprising, a valve defining a fluid conduit, conduit closure means including a valve element movable with respect to said housing for opening and closing said conduit, a trip rod connected to said valve element, and means mounting said trip rod to said housing for movement with respect to said housing to move said valve element, said mounting means including a plurality of separators surrounding a portion of said trip rod on a common axis therewith, each of said separators comprising a pair of axially spaced and aligned cylindrical walls of different diameters and an annular wall normal thereto and joining same, said separators being nested, and a plurality of annular expanders, each expander being positioned between the smaller of said cylindrical walls of one of said separators and the larger of said cylindrical walls of the immediately adjacent one of said separators, said expanders being of a material having a high thermal expansion coefficient and engaging said annular walls to produce axial displacement of said separators along said trip rod upon a thermally induced change in size of said expanders.

10. A device according to claim 9 wherein said closure means comprise a poppet having an actuating stem, said valve element being movable to engage and displace said poppet.

11. A valve according to claim 10 including spring means biasing said poppet to a closed position.

12. A valve according to claim 10 including spring means biasing said poppet to an open position.

* * * * *